United States Patent [19]

Inoue et al.

[11] 4,411,457
[45] Oct. 25, 1983

[54] INSULATED PIPE JOINT

[75] Inventors: Takeo Inoue; Takashi Shirazawa, both of Amagasaki, Japan

[73] Assignee: Mitsubishi Denki Kabushiki Kaisha, Tokyo, Japan

[21] Appl. No.: 250,789

[22] Filed: Apr. 3, 1981

[30] Foreign Application Priority Data

Apr. 14, 1980 [JP] Japan .................................. 55-51152

[51] Int. Cl.³ ............................................ F16L 55/00
[52] U.S. Cl. ....................................... 285/52; 285/54; 285/401
[58] Field of Search ......................... 285/54, 52, 401; 174/85, 180, 183, 184, 185

[56] References Cited

U.S. PATENT DOCUMENTS

| | | | |
|---|---|---|---|
| 410,293 | 9/1889 | Rockwell | 285/52 |
| 593,381 | 11/1897 | Lau et al. | 285/52 |
| 1,194,793 | 8/1916 | Styers | 285/376 |
| 2,257,385 | 9/1941 | Keegan | 285/52 X |
| 2,574,191 | 11/1951 | Platzer | 285/52 |
| 3,018,119 | 1/1962 | Champion | 285/54 X |
| 3,115,354 | 12/1963 | Bowan et al. | 285/52 |

FOREIGN PATENT DOCUMENTS

| | | | |
|---|---|---|---|
| 208159 | 3/1960 | Fed. Rep. of Germany | 285/52 |
| 2411891 | 9/1975 | Fed. Rep. of Germany | 285/54 |

Primary Examiner—Thomas F. Callaghan
Attorney, Agent, or Firm—Sughrue, Mion, Zinn, Mcpeak and Seas

[57] ABSTRACT

An insulated pipe joint and a method for producing the joint in which first and second tubular portions are joined through an insulating member disposed in a gap between the first and second tubular members. The first tubular member has a flange portion at one end thereof while the second tubular member has a cap portion which accommodates the flange portion of the first tubular member with the gap being formed between the cap and flange portions. The insulating member disposed in the gap hermetically couples the first and second tubular members while electrically insulating them from one another.

8 Claims, 5 Drawing Figures

INSULATED PIPE JOINT

BACKGROUND OF THE INVENTION

The present invention relates to an insulated pipe joint which is formed with a communication passage at its center and which is intended to be used under conditions of high tensile load including both a high tensile load and a rising temperature. The invention further relates to a method for producing this joint. More particularly, the present invention relates to an insulated pipe joint which is formed with a communication passage and which is used to suspend and hold, in an insulating manner, the electrode pipe of an oil sand well for an electrically heating system and to a method for producing this joint.

Recently, an electrical heating system has been proposed for pumping oil out of oil sand in underground deposits. According to this system, two oil wells, which reach an underground oil sand layer and which may be as deep as several hundred meters, are drilled at a preset spacing. Potentials are applied to electrodes positioned at the bottoms of the wells thereby to supply an electric current therebetween to raise the temperature of the oil sand layer and hence to lower the viscosity of the oil contained therein to a sufficient extent that the oil can be pumped out. Since the electric resistance of an oil sand layer is generally higher than that of the layers over the oil sand layer, the tubular electrodes for the power supply buried in the oil sand layer must be electrically insulated from the oil pumping steel pipes. To accomplish this, an insulated pipe joint is coupled to the steel pipe in the oil sand layer and the tubular power supply electrode is coupled to the insulated pipe joint. With the insulated pipe joint having the construction thus far described, it is always subjected to a tensile load. Moreover, once the temperature of the surrounding layer is raised as a result of the electric current, the temperature of the insulated pipe joint itself is raised making it necessary that the joint retain a high tensile strength even under high temperature conditions. Moreover, since the insulated pipe joint is buried underground as deep as several hundred meters under the conditions of having its lower end coupled to the power supply electrode and its upper end coupled to the steel pipe, it is practically inevitable that the insulated pipe joint will contact or collide with the bore wall during its installation. Since the insulated pipe joint has a considerable total weight so that even slight contact results in a remarkably strong mechanical impact, the insulated pipe joint must have sufficient strength to endure such a mechanical impact.

A great deal of research has heretofore been carried out attempting to provide an insulated pipe joint which can satisfy the bove-mentioned requirements. A first of the known pipe joint constructions is a flanged tubular article made of metal having its entire surface coated with an organic resin having excellent heat-resisting characteristics such as polytetrafluoroethylene (for example "Teflon TM" which is trade name of du Pont). This insulated pipe joint satisfies the tensile strength and the mechanical impact requirements. However, the joint has the defect that the insulating characteristics are insufficient in case the coating is thin and that, even if the insulating characteristics are sufficient at room temperature if the coating is thick, the coating tends to separate due to the intrinsic difference in the coefficients of thermal expansion of the metal and resin because the insulated pipe joint is repeatedly heated to a temperature of 250° to 300° C. then cooled in practical operating conditions.

A second known pipe joint construction uses procelain material. Since the insulated pipe joint is intrinsically required to be water or oil tight, it is necessary to appropriately provide the connection between the steel pipe, the power supply electrode and the procelain pipe and between the different procelain pipes. Generally, this has been done by shrink fitting a metal pipe on the outer circumference of the procelain pipe and then another metal pipe is attached by welding or screw fitting. With this joint construction, the desired water or oil tight characteristics are attained. However, since stress is concentrated at the leading end portion of the procelain pipe which has been shrink fitted, there is a defect that the mechanical strength, especially, the resistance to impact of the joint is so low that breakage is liable to take place. Moreover, the strength of the shrink fit joint deteriorates with a rising temperature thereby reducing the tensile strength of the joint.

Yet further, there has been proposed a joint in which flanged portions are formed at both ends of a procelain pipe which are fastened thereto by metal members with packings sandwiched between the contacting surfaces. With this joint, although the sealing effects are sufficient at room temperature, at high temperatures the sealing effect is insufficient due to the differences in the coefficients of thermal expansion between the procelain and the metal. In addition, since procelain essentially lacks mechanical impulse force strength as described hereinbefore, procelain has a high likelyhood of being broken by mechanical impulse forces which are produced during the installation of the joint. It is thus remarkably difficult to use procelain as a practical matter.

SUMMARY OF THE INVENTION

Accordingly, the invention provides an insulated plate joint including a first tubular member formed with a flange portion at one end thereof and a second tubular member having one end thereof formed with a cap portion which is designed to accommodate the flange portion of the first tubular member with a gap therebetween. An insulating member is disposed in the gap between the flange portion and the cap portion for hermetically coupling the first and second tubular members and for insulating the first and second tubular members from each other. The first insulating member includes a first insulating portion disposed in the gap between the flange portion and the cap portion and second insulating portions formed integrally with the first insulating portion and mounted on inner and outer circumferential portions of the tubular members. The insulating member may also be formed with an insulating portion mounted on an outer circumferential portion of the first tubular member and a flange portion formed integrally with the insulating portion and which is mounted on the outer circumferential portion. The cap portion may be formed with a cover portion formed with a notched portion shaped such that the flange portion can be accommodated in the cap portion through the notched portion. The cap portion of the second tubular member may be threadedly joined to a cylindrical portion of the second tubular member or the cap portion may be welded to a cylindrical portion of the second tubular member. The insulating member is preferably formed as a glass-mica molding composed of gass and mica powders. The insulating member preferably also is formed with mica scale particles having planes arranged substantially parallel to walls of the tubular members at portions of the insulating member adjacent the walls.

Yet further, the invention can be practiced by a method of producing an insulated pipe joint including the steps of providing a first tubular member having a flange portion at one thereof; providing a second tubular member having a cap portion at one end thereof adapted to receive the flange portion of the first tubular member with a gap therebetween; providing a mold including a molding flask, a split wall portion adapted to be received in the molding flask, a supporting member for supporting the second tubular member, a holding member for holding the first tubular member, an auxiliary wall portion for constructing an outer circumferential insulating portion and a flange insulating portion, and a pressure member; heating the mold and the second tubular member, placing the second tubular member upon the supporting member, heating the first tubular member, disposing the flange portion of the first tubular member in the cap portion of the second tubular member, placing the first tubular member upon the holding member, placing the auxiliary wall portion upon the cover portion of the second tubular member, providing and heating a preliminary molded member formed of insulating material, placing the preliminary molded member upon the auxiliary wall portion, and placing the pressure member upon the preliminary molded member and applying a pressure to the preliminary molded member to cause the insulating material of the preliminary molded member to flow into the gap.

BRIEF DESCRIPTION OF THE DRAWINGS

FIGS. 1A and 1B show a construction of an insulated pipe joint according to the present invention of which FIG. 1A is a top plan view and FIG. 1B is a longitudinal section taken along a line 1B—1B;

DESCRIPTION OF THE PREFERRED EMBODIMENTS

The invention has succeeded in providing an insulated pipe joint having entirely satisfactory characteristics, which is formed with a communication hole at its center, which is comletely free from the aforementioned defects and which is well adapted for use in the electrical heating system of an oil sand well installation. The construction of the insulated pipe joint and the method of producing the same will now be described in detail.

Figure 1A:
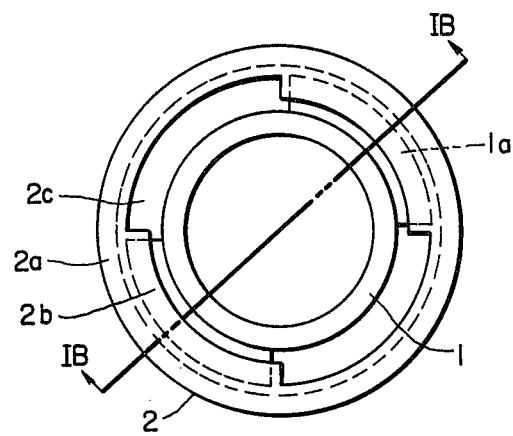
Figure 1B:
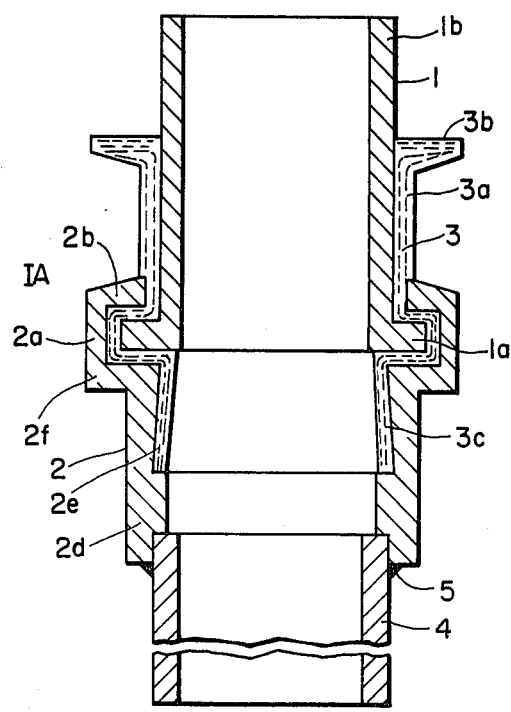

A preferred embodiment of an insulated pipe joint of the invention is shown in FIGS. 1A and 1B of which FIG. 1A is a top plan view and FIG. 1B is a longitudinal section taken along line 1B—1B in FIG. 1A. (For clarity, FIG. 1A omits an insulating member 3.) Reference numeral 1 in FIGS. 1A and 1B indicates a first tubular member which has a cylindrical portion 1b formed at one end thereof with two disc-shaped flange portions 1a diametrically oppositely facing each other which are slightly narrower than quadrant sectors. Reference numeral 2 indicates a second tubular member which is formed with a cap portion 2a at one end and which has a cover portion 2b formed with two notched portions 2c diametrically oppositely facing each other and having a slightly larger outside diameter than the flange portions 1a of the first tubular member 1. A cylindrical portion 2d is provided which forms a conical cavity portion 2e at its inside. The flange portions 1a of the first tubular portion 1 are inserted through notched portions 2c of the cover portion 2b of the second tubular portion into the cap portion 2a and turned at a right angle so that the flange portions 1a are held in place by the cover portion 2b while forming a gap between the first tubular member 1 and the second tubular member 2. Reference numeral 3 indicates an insulating member which is formed as a glass-mica molded member prepared by heating a mixture of glass powders and mica powders to a temperature sufficiently high to soften the glass and to make the glass flow under pressure and by molding the heated material powders under pressure. The insulating member 3 thus constructed has an insulating portion 3a on the outside of the first tubular member 1, a flanged insulating portion 3b, an insulating portion fitted in the gap between the first tubular member 1 and the second tubular member 2, and an insulating portion 3c inside the second tubular member 2, all of which are formed integrally. The flanged insulating portion 3b is necessary for the molding process and, upon completion of the joint, may either be left as is or machined away. Reference numeral 4 indicates a third tubular member which is welded at 5 to the cylindrical portion 2d thereby to complete the insulated pipe joint having a communication passage.

It is to be noted that if the cylindrical portion 2d is made sufficiently long, the third tubular member 4 may be dispensed with.

A preferred method of the present invention for fabricating the above-described joint will now be described with reference to FIG. 2 in which the lefthand half of the figure shows the condition of the joint immediately before a pressure molding process and the righthand half of the figure shows the condition of the joint after the pressure molding process. Reference numeral 6 indicates a splitting wall portion, reference numeral 7 indicates a molding flask, and reference numeral 8 indicates a supporting member which supports the second tubular member at a shoulder portion 2f and holds the bottom of the cylinder portion 2d. Reference numeral 9 indicates a holding member which has its outer side fitted in the cylindrical portion 2d of the second tubular member 2 thereby to provide the conical inner circumferential insulating portion 3c in the cavity portion 2e and which has its top surface holding the first tubular member 1. Reference numeral 10 indicates an auxiliary wall portion 10 which has a split construction with its bottom surface contacting the cover portion 2d of the second tubular member 2 of inclined surface construction and its top surface inclined such that its outer circumference is at a higher level. Reference numeral 11 indicates a pressure member which is fitted on both the outer circumference of the cylindrical portion 1b of the first tubular portion 1 and the splitting wall portion 6.

The mold thus includes the five parts 6, 7, 8, 9 and 10. Using this mold, the first tubular member 1 and the second tubular member 2 are formed. The materials for those metal members are not especially limited and may be steel or steel alloys such as stainless steel which has sufficient strength at high temperatures. The mold may be made of similar materials. Reference numeral 12 indicates a preliminary molded member which is molded in a predetermined shape at a room temperature and under pressure using a powder mixture such as glass and mica powders and another mold (although not shown).

An example of a method for producing the insulated pipe joint will be described. First, preliminary molded member 12 is produced. The raw material of the molded member includes glass and mica powders. The glass powder is formed of crushed glaze for use in iron or enamelling a container and may, for instance, be No. 2312 produced by Nippon Ferro K.K., while the mica powder is formed of synthetic phlogopite mica. 45 wt% of glass powder having a mesh size of 200 and 55 wt% of mica powder having a mesh size of 60 to 200 are mixed together, and mixture moistured with 5 wt% of water (5 parts by weight relative to 100 parts by weight of powders). 1500 grams of the resultant raw material was used for molding. The preliminary molded member is produced by employing another mold (not shown) at room temperature. The preliminary molded member has a cylindrical shape having inner and outer diameters of 117 mm and 155 mm, respectively. The cylindrical molded member thus produced is subjected to drying to remove the contained water therefrom by placing the preliminary molded member in a drying chamber at a temperature of 120° C. for 2 hours.

Next, with regard to the first tubular member 1, the tubular member 1 includes an iron sleeve 1b having an axial length of 290 mm and inner and outer diameters of 100 mm and 112 mm, and flange portions 1a connected to the lower end of the sleeve 1b. The flange portions 1a made of iron are positioned at diametrically opposite sides of the sleeve with each being of fan shape. Each flange has a thickness of 10 mm. These provides imaginary outer diameter of 140 mm. Each flange is smaller than an exact quadrant by 1 mm at its both radial sides.

The second tubular member 2 includes an iron sleeve 2d having an axial length of 144 mm and inner and outer diameters of 112 mm and 132 mm, respectively. The sleeve 2d is formed with a conical recess 2e at its inner peripheral surface. The distance between the conical bottom and the lower end of the sleeve 2d is 49 mm, and the bottom of the conical recess is 120 mm while the tapered portion has an inclination of 4/100. The second tubular member also includes a shouldered portion 2f connection to the upper ends thereof and having a thickness of 7 mm and outer diameter of 160 mm. Further, a cap portion 2a is connected to the upper surface of the shouldered portion 2f and has inner and outer diameters of 148 mm and 160 mm, respectively, and an axial length of 18 mm. The cap portion 2 further provides protrusions 2b directed radially inwardly. The protrusions 2b provide an imaginary inner diameter of 148 mm with the upper surface being downwardly inclined along the radially outward direction by an inclination of 1/5. Each of the protrusions has a thickness of 15 mm at its inner side. The protrusions are positioned at diametrically opposite sides with each having a circumferential length of one-fourth of the entire circumference of the cap portion. In another aspect, a pair of recessed portions 2c are defined between the projections 2b at diametrically opposite sides. The imaginary inner diameter of the recesses is 142 mm.

Figure 2:
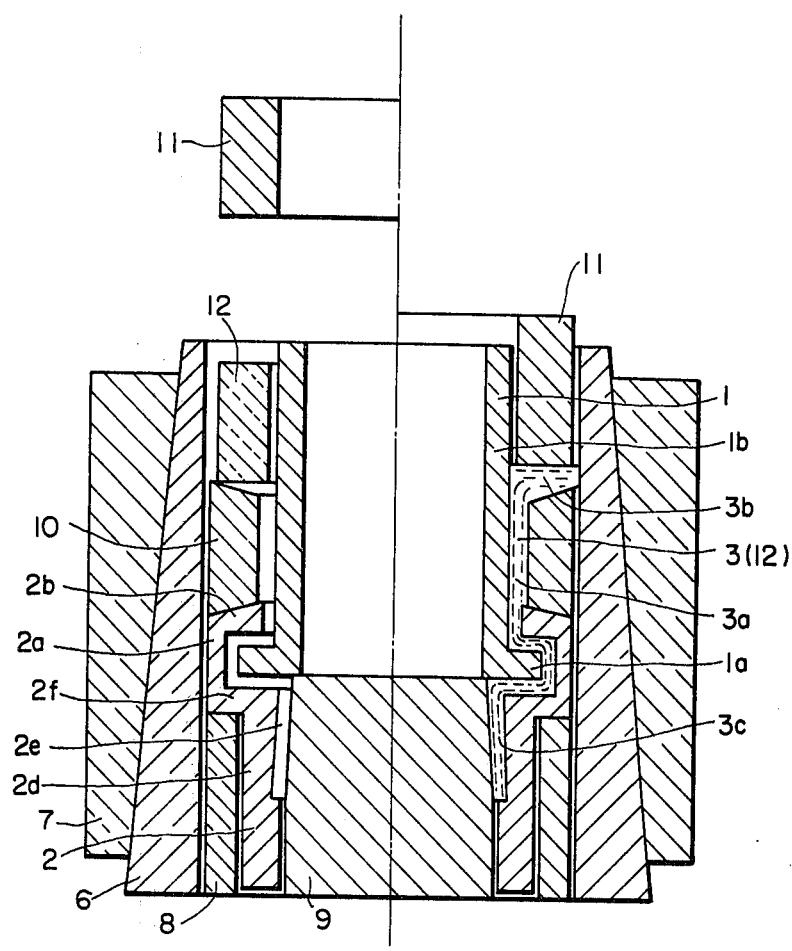
FIG. 2 illustrates, in a sectional view, an example of a method of producing the insulated pipe joint according to the present invention of which the lefthand part shows conditions immediately before a pressure-molding process and the righthand part shows conditions after the completion of the pressure-molding process.

For molding process, the molding flask 7, the wall portion 6, the supporting member 8 and the holding member 9 of the mold were assembled as shown in the left side of FIG. 2. However, the auxiliary wall portion 10 and the pressure member 11 were left unassembled and were heated to 350° C. and the preliminary molded member 12 was heated to 850° C. After heating, the second tubular member 2 was inserted into the wall portion 6 around the holding member 9 and the shoulder portion 2f was placed on the supporting member 8. Then, the flange portions 1a of the first tubular member 1 were inserted through the notched portions 2c of the second tubular member 2 and turned at an angle of 45 degrees to be placed on the holding member 9. Then, the auxiliary wall portion 10 was placed on the cover portion 2b of the second tubular member 2. Finally, the preliminary molded member 12 was placed on the auxiliary wall portion. The condition at this time is shown on the left side of FIG. 2. Then, the pressure member 11 was placed on the preliminary molded member 12 and a pressure of 100 tons was applied to the preliminary molded member 12. The condition following the application of pressure is shown on the right side of FIG. 2. As the pressure was applied, the material of the preliminary molded member flowed into the member 3 made of the glass-mica molded material. The entire assembly was cooled to 300° C. and the mold then disassembled to allow the molded product to be removed. In the completed product, the outer circumference insulating portion 3a had a length of 100 mm t.

Specific features of the molding process will be described in further detail. First, the pressure application to the preliminary molded member 12 by the pressure member 11 will be described. A high external pressure is applied to the cylindrical portion 1b in the vicinity of the lower end portion of the pressure member 11 under the conditions shown in FIG. 2 to prevent deformation from taking place in case the wall thickness is small. Should deformation be present, it is necessary to provide a reinforcing member at the inside. It is very important for the aforementioned embodiment that the flanged insulating portion 3b be formed at an upper portion of the insulating member 3.

The mica powder particles have a thin leaf structure. Generally, the ratio of the average diameter to the thickness of a particle is 30 to 50:1. The mechanical strength and electrical characteristics of a glass-mica molded product obtained by pressure-molding in the presence of molten glass are largely determined by the mutual configurations of the mica particles of the thin leaf structure. For example the mchanical tensile strength of the molded product along the trace-slip direction (the direction parallel to the planes in which the particles lie) is 3 to 10 times as large as that along the direction perpendicular thereto. On the other hand, the mechanical compression strength of the product along the transverse direction of the layers defined by the stack of thin-leaf structures is 3 to 10 times as large as that along the trace-slip direction. Further, the dielectric breakdown strength of the product along the transverse direction of the layers is 3 to 10 times as large as that along the trace-slip direction. It is most desirable that the mica particles of the thin leaf structure be oriented with their planes parallel to the wall of the tubular members in the regions adjacent wall surfaces. Since the inner surface of the insulating portion 3a and the outer surface of the insulating portion 3c are required to provide sufficient tensile strength in the axial direction, the particles should be oriented with their planes parallel to these surfaces. Moreover, since the gap defined between the first and second tubular members 1 and 2 must provide insulating resistance, and since the gap defined between the flange portion 1a and the cover portion 2b is subjected to compression when a tensile force is applied to the tubular members 1 and 2, particles should be oriented parallel to the extending direction of the flange 1a. In FIGS. 1 and 2, particle orientation is shown by a broken line, in which the particles in the insulating portion 3b having a flat disc shape are oriented in a direction perpendicular to the axial direction of the cylindrical portion 1b of the first tubular member 1. This means that orientation of the particles in the upper portion of the preliminary molded member 12 are not changed but merely displaced downwardly to form the flange portion 3b. On the other hand, the particles in the remaining portion of the molded member 12 flow into the gap portions resulting in the orientation of the particles being parallel to the wall surfaces. That is, the primary object is to render the particles in the outer insulation 3a to be oriented parallel to the side wall. Further, such parallel orientation is promoted as the flow rate increases. Therefore, in order to increase the flow rate, the effective area of the preliminary molded member 12 which is subjected to compression should be as large as possible. The auxiliary wall portion 10 is provided to increase the effective area for receiving the compression force.

Moreover, the fact that the outer surface of the holding member 9 has a conical shape facilitates the opening and separation of the mold. A large gradient is preferred. If, however, the gradient cannot be enlarged by changing the shape and size of the members used, opening and separation of the mold can be facilitated by the use of a parting agent.

In the process described above, the glass used has been described as being a glaze used for enamel coatings on steel articles, which is commercially available. However, there is no particular limitation upon this component. For instance, lead glass or the like may be used depending on the particular application. As to the mica powders, since they are heated to a temperature higher than 800° C. while mixed, a mica substance which will decompose at that temperature cannot be used. In other words, natural mica cannot be used and only synthetic mica can be used. Of the synthetic micas, synthetic phlogopite mica is the most preferred.

Next, the relationship among the heating temperatures of the mold, the tubular members and the preliminary molding will be described. The heating temperature of the mold is strongly dependent on the transition temperature of the glass material. More specifically, if the heating temperature is excessively higher than the transition temperature, the insulating member may stick during the pressure-molding process so that separation of the mold becomes difficult. In the case of an excessively low temperature, portions having a low density tend to be formed. Therefore, it is desired that the heating temperature be slightly lower than the transition temperature. Moreover, the temperature for the pressure release and disassembly has to be lower than the transition temperature. Thus, it is impossible to determine the temperature while taking this point into consideration. The heating temperatures of the first and second tubular members are strongly dependent on the heating temperature of the preliminary mold. If the heating temperature is higher than the transition temperature of the glass, no portion having a low density will be formed. If that temperature is excessively lower than the temperature of the preliminary molded member, the preliminary molded member will cool to the extent that its viscosity increases and hence its fluidity lowered making it difficult to effect filling uniformly. On the contrary, if the heating temperature under consideration is excessively high, the mechanical strength of the various member will be lowered so that there may be deformation thereof. In fact, it is desired that the temperature be slightly lower than the heating temperature of the preliminary molded member.

The temperature of the preliminary molded member is closely dependent on the softening temperature and the concentration of the components of the particular glass material so that it cannot be specified unless the glass material is specified. However, the temperature should be chosen so as to make the preliminary molded member fluid under pressure. If glaze for an enamel coating of steel articles is used, for example, a temperature equal to or higher than the enameling or sintering temperature of the steel articles by 50° C. falls within a proper temperature range.

The foregoing description of a preferred method of producing an insulated joint in accordance with the invention has been directed to a technique in which a mold constructed of the molding flask 6 and the split wall portion 7 are employed. The molding technique is not limited thereby but can be practiced using a pressure molding machine equipped with a fixing board at the center portion thereof and drive units at upper and lower portions with the molding flask and the wall portion coupled to the center fixing board and the supporting member, the holding member 9 to the lower drive unit, and the pressure member 11 to the upper drive unit, and in which a mold equipped with a heating device is used so that the molding process can be continuously performed. Using such a system, the production cost can be remarkably reduced.

Figure 3:
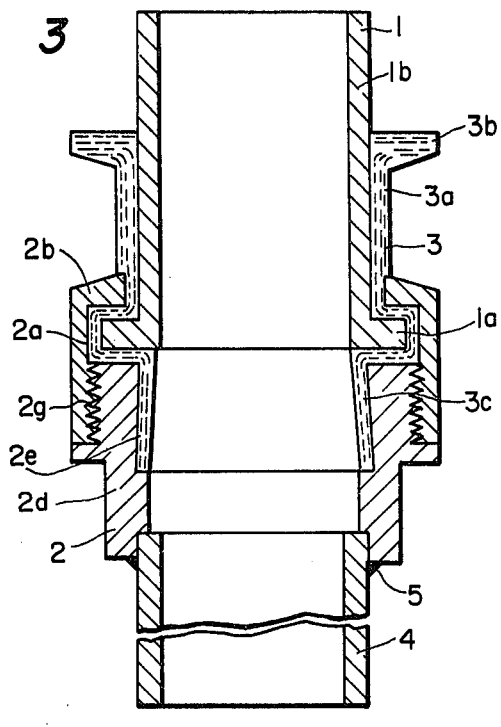
FIGS. 3 and 4 are sectional views showing other embodiments of the present invention.
Figure 4:
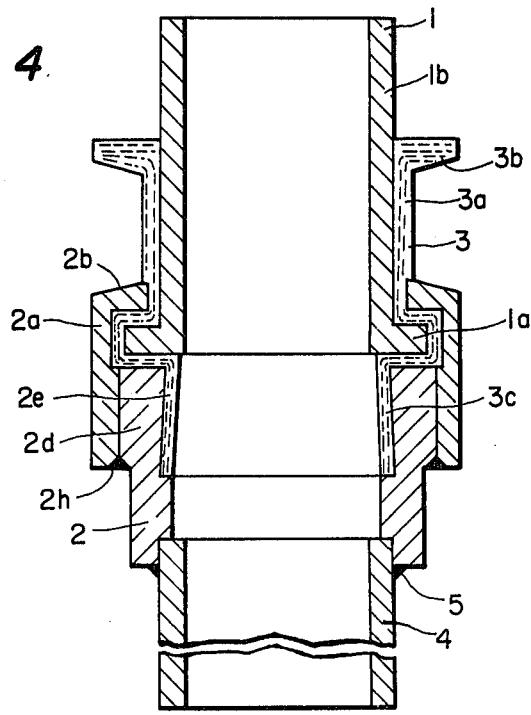

The joint thus far described can be joined to a third tubular member 4, which has the same size as the cylindrical portion 1b of the first tubular member 1, at the cylindrical portion 2d by the use of a well-known technique such as welding as shown at 5 in FIGS. 3 and 4.

The insulated pipe joint according to the present invention is so constructed that the tensile force applied to both ends of the joint is converted into a compression force acting between the flange portions 1a and the cover portion 2b. In the case of inorganic material, generally, the compression strength thereof is several times as high as the tensile strength, while the compression strength of the insulating member, which is made of oriented glass-mica in the preferred embodiment, has different strengths in different directions depending on the direction of orientation of the mica particles. The strength is remarkably high in a direction perpendicular to the laminating direction. Since this orientation is advantageously employed in the insulated pipe joint of the invention, the overall strength of the joint is largely determined by the construction of the metal portions. On the other hand, since a glass-mica molding insulating portion has a higher elasticity and a higher impact strength than procelain, the possibility of breakage is remarkably low, even against unexpected impact forces generated during installation so that the breakage problem associated with the prior art product is completely eliminated.

The insulated pipe joint according to the present invention can be used not only in an oil well installation for electrically heating oil sand but is also suitable for use in a water or gas pipe installation which requires an insulated portion so as to prevent corrosion of the pipe.

Moreover, although the foregoing description of the invention has been directed to a particular construction, it is possible to use a construction as shown in FIG. 3 in which the flange portion 1a of the first tubular member 1 is formed over the entire circumference, in which the cover portion 2b of the second tubular member 2 is divided into the cap portion 2a extending over the entire circumference and the cylindrical portion 2d, and in which the two portions 2a and 2d are threadedly attached at 2g after the first tubular member 1 has been inserted. As shown in FIG. 4, moreover, it is also possible to join the two portions 2a and 2d by welding as indicated at 2h. In this case, there is little change in the production method and the resulting increased strength is advantageous.

Moreover, although the embodiment described with reference to FIG. 1 has the first tubular member 1 formed with two flange portions, the first tubular member can be suitably modified such that the flange is divided into four or six parts.

As has been described hereinbefore, since the tensile force applied to the ends of the joint is converted into a compression force acting between the flange portions and the cap portion, the insulated pipe joint of the invention has a strong resistance to a tensile load. Especially in case the insulating member is made of an inorganic material, since the compression strength has a value several times as high as the tensile strength, the insulated pipe joint according to the present invention is considered quite effective.

Still further, if a glass-mica composition is used for the insulating member, the insulated pipe joint has excellent thermal properties and can be used under conditions of high temperature.

What is claimed is:

1. An insulated pipe joint comprising:
   a first tubular member formed with a flange portion at one end thereof;
   a second tubular member having one end thereof formed with a cap portion which accommodates said flange portion of said first tubular member with a gap therebetween;
   an insulating member disposed in said gap between said flange portion and said cap portion for hermetically coupling said first and second tubular members and for electrically insulating said first and second tubular members from each other;
   said insulating member comprising a glass-mica molding comprising glass and mica powders, said mica powders comprising mica scale particles having planes arranged substantially parallel to walls of said tubular members at portions of said insulating member adjacent said walls.

2. The insulated pipe joint as set forth in claim 1 wherein said insulating member comprises a first insulating portion disposed in said gap between said flange portion and said cap portion, and second insulating portions formed integrally with said first insulating portion and mounted on inner and outer circumferential portions of said tubular members.

3. The insulated pipe joint as set forth in claim 1 wherein said insulating member comprises an insulating portion mounted on an outer circumferential portion of said first tubular member, and a flange portion formed integrally with said insulating portion and mounted on said outer circumferential portion.

4. The insulated pipe joint as set forth in any of claims 1 to 3 wherein said cap portion comprises a cover portion formed with a notched portion shaped such that said flange portion can be accommodated in said cap portion through said notched portion.

5. The insulated pipe joint as set forth in any of claims 1 to 3 wherein said cap portion of said second tubular member is threadedly joined to a cylindrical portion of said second tubular member.

6. The insulated pipe joint as set forth in any of claims 1 to 3 wherein said cap portion of said second tubular member is welded to a cylindrical portion of said second tubular member.

7. The insulated pipe joint as set forth in claim 1 wherein said mica scale particles have an average diameter to thickness ratio between 30 and 50:1.

8. The insulated pipe joint as set forth in claim 1 wherein said mica powders comprise synthetic phlogopite mica.

* * * * *